(12) United States Patent
Grosse Bley

(10) Patent No.: US 7,571,634 B2
(45) Date of Patent: Aug. 11, 2009

(54) LEAK DETECTOR WITH SNIFFER PROBE

(75) Inventor: Werner Grosse Bley, Bonn (DE)

(73) Assignee: Inficon GmbH (DE)

( * ) Notice: Subject to any disclaimer, the term of this patent is extended or adjusted under 35 U.S.C. 154(b) by 58 days.

(21) Appl. No.: 11/794,082

(22) PCT Filed: Nov. 29, 2005

(86) PCT No.: PCT/EP2005/056319
§ 371 (c)(1),
(2), (4) Date: Jun. 22, 2007

(87) PCT Pub. No.: WO2006/069877
PCT Pub. Date: Jul. 6, 2006

(65) Prior Publication Data
US 2008/0000288 A1 Jan. 3, 2008

(30) Foreign Application Priority Data
Dec. 23, 2004 (DE) .................. 10 2004 062 102

(51) Int. Cl.
*G01N 29/32* (2006.01)
(52) U.S. Cl. ..................... 73/23.21; 73/31.05
(58) Field of Classification Search ............. 73/40.7, 73/23.34, 23.2, 23.21, 31.03, 31.05, 403
See application file for complete search history.

(56) References Cited
U.S. PATENT DOCUMENTS 2,947,166 A * 8/1960 Palmer et al. .............. 73/40.7
4,477,986 A 10/1984 Marshall et al.
4,580,443 A * 4/1986 Marshall et al. ............ 73/40.7
4,897,551 A * 1/1990 Gersh et al. ............. 250/461.1
4,898,021 A * 2/1990 Weaver et al. .............. 73/40.7
5,010,761 A * 4/1991 Cohen et al. ............... 73/40.7
5,347,845 A 9/1994 Kepler et al.
5,780,724 A * 7/1998 Olender et al. .......... 73/40.5 A
5,834,632 A * 11/1998 Olender et al. ............. 73/40.7
7,159,445 B2 * 1/2007 Bohm et al. ............... 73/23.2
2004/0194533 A1 * 10/2004 Bohm et al. .............. 73/23.34

FOREIGN PATENT DOCUMENTS

JP 2001050852 A * 2/2001

OTHER PUBLICATIONS

International Search Report for PCT/EP2005/056319 dated Feb. 7, 2007 (3 pages).

* cited by examiner

*Primary Examiner*—John Fitzgerald
(74) *Attorney, Agent, or Firm*—Marjama Muldoon Blasiak & Sullivan LLP

(57) ABSTRACT

The invention relates to a leak detector including a hand-held device with a sniffer tip. A distance detector for detecting a defined distance of the sniffer tip from the test object is provided on the sniffer tip. A test is only initiated if the distance between the sniffer tip and the test object is correct, thereby avoiding measuring errors due to wrong manual positioning of the sniffer probe. The leak detector can also be provided with an acceleration detector, which permits the test to be carried out only if the sniffer probe is kept steady.

7 Claims, 1 Drawing Sheet

LEAK DETECTOR WITH SNIFFER PROBE

FIELD OF THE INVENTION

The invention is directed to a leak detector with a sniffer probe, the sniffer probe comprising a hand-held device with a sniffer tip.

BACKGROUND OF THE INVENTION

Today, many installations and products in industry and research are faced with high demands as to their tightness. With specimens or assemblies produced in cryogenic, automobile and other industries, frequent use is made of a sniffer leak detection. This implies that a test gas, preferably under high pressure, is present in the object to be examined. Frequently, the test gas used is helium which is introduced into the cavities to be tested for leaks before these cavities are closed. It is also known to use as test gases those gases already present in the test objects, e.g. $Sf_6$ or halogen gases in the cryogenic industry.

The specimen to be examined for leaks is scanned using a hand-held device with a sniffer tip. The sniffer tip receives the test gas flowing from a possibly existing leak and directs it to a test gas detector. Together with other components, the latter may be situated in a base device that is communicated with the sniffer probe through a flexible sniffer conduit. When the test gas detector is sufficiently small in size, e.g. an infrared gas analyzer, it may also be situated in the hand-held device itself, thereby reducing the response time.

Leak detectors comprising a hand-held device can lead to erroneous measurements if the hand-held device is operated incorrectly. Thus, an unsteady guiding of the hand-held device caused by a lack of concentration might result in "nothing being measured", the test object being rated as good, i.e. tight. The same is true when the measurement is initiated at an inappropriate distance of the sniffer probe from the test object.

WO 03/008923 A2 describes a sniffer leak detector comprising a hand-held device with an acceleration sensor accommodated therein. The acceleration sensor serves to suppress signals disturbed by movements of the hand piece.

SUMMARY OF THE INVENTION

It is the object of the invention to provide a leak detector comprising a sniffer probe, which provides extensive protection against inappropriate operation.

The leak detector of the present invention is defined by a sniffer tip that is provided with a distance detector for detecting a defined distance of the sniffer probe from a test object, which detector allows to initiate a test operation only if the distance is correct. The invention guarantees that the test operation can occur only if the distance of the sniffer tip to the test object is observed. Thus, erroneous measurements resulting from an incorrect measuring distance are avoided.

The distance detector may principally be of any type. For example, the distance detector used may be an inductive or a capacitive proximity switch—Preferably, the distance detector is an optical detector comprising a light transmitter projecting a light spot and a light receiver measuring the reflected intensity. Such a distance detector may be accommodated in the sniffer tip such that it does not substantially increase its configuration so that the handling of the sniffer probe is not impaired thereby. However, proximity switches require more space.

A preferred embodiment of the invention provides that an acceleration detector for detecting whether the hand-held device is held steady and allowing an initiation of the test operation only if the hand-held device is held steady. Such an acceleration detector may include an inert mass, for example, movable with respect to the housing of the hand-held device and closing an electric contact when it leaves its rest position. The acceleration detector guarantees that a measurement is performed only if the hand-held device is held steady.

According to the preferred development of the invention, the sniffer tip is provided with an ink outlet that is actuated after a measurement and sprays an ink mark on the test object. The test mark may comprise one or several ink pulses. It documents that a sniffing operation has been performed at the respective part of the test object. In the event that a plurality of ink pulses are used successively, it can be documented that the sniffer probe has been held steadily if all ink spots overlie each other, or that the sniffer probe has been moved if the ink points are distributed.

According to a preferred development of the invention, a manual switch key is provided, whose actuation allows to perform the testing operation only after the fulfillment of the test conditions has been reported.

BRIEF DESCRIPTION OF THE DRAWINGS

Hereinafter, an embodiment of the invention will be described in detail with reference to the drawings, in which.

DETAILED DESCRIPTION

Figure 1:
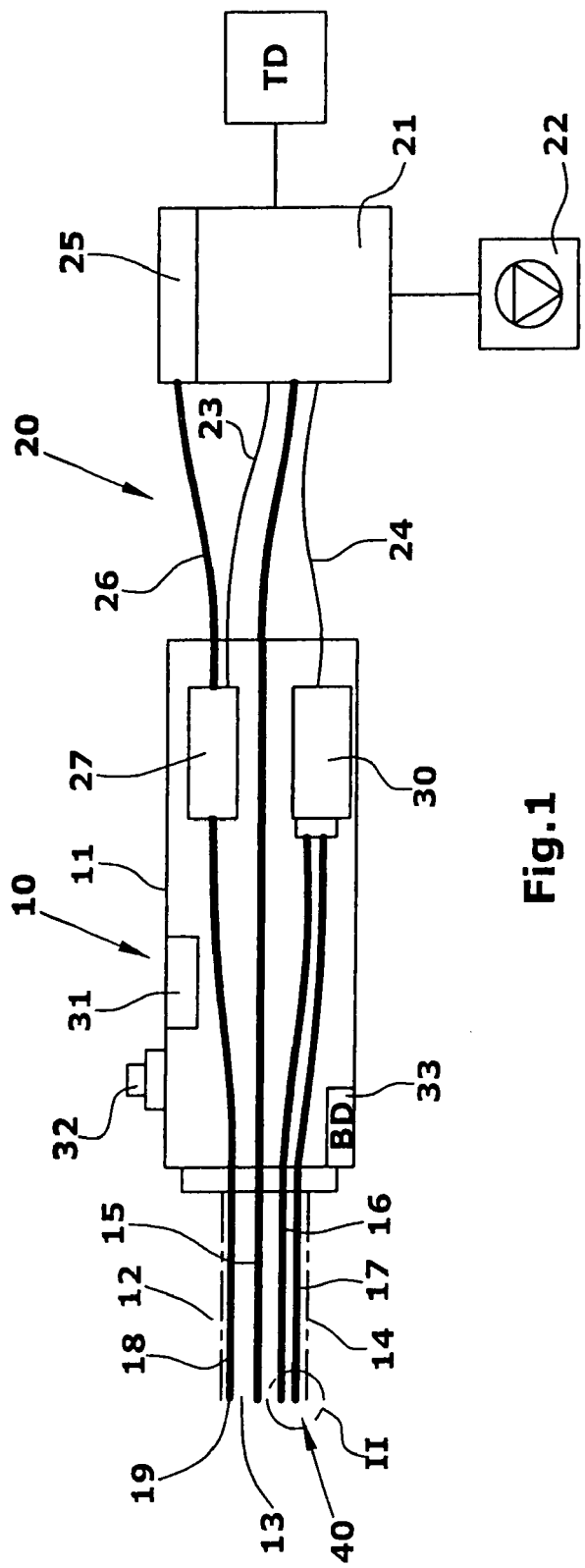
FIG. 1 is a schematic illustration of the leak detector.

The leak detector illustrated includes a sniffer probe 10 formed by a hand-held device 11 and a sniffer tip 12 projecting therefrom. The sniffer probe 10 may be shaped like a gun, for example. In any case, it forms a hand-held device adapted to be held and guided manually, the end 13 of the sniffer tip 12 being brought close to the test object to receive test gas leaking from the test object. The sniffer tip 12 may comprise a sheath 14 fastened to the hand-held device 11, which accommodates the lines to be explained hereinafter and has an open outer end.

A capillary gas line 15, two light guides 16, 17 and an ink line 18 extend through the sniffer tip 12. Each of these lines is open at the end 13.

The capillary gas line 15 is passed through the hand-held device 11. From the rear end of the hand-held device 11, a sniffer line 20 extends to a base device 21. The sniffer line 20 includes the lines explained hereinafter. It is generally flexible so that the hand-held device 11 can be moved and guided manually with respect to the base device 21. The base device 21 is provided with a vacuum pump 22 which creates a vacuum in a vacuum chamber (not illustrated) of the base device 21, whereby the capillary gas line 15 takes in gas at the end 13. The base device 21 is further provided with a test gas detector TD adapted to selectively detect the test gas escaping from the test object and to distinguish it from other gases. The test gas detector may be a mass spectrometer or an infrared gas analyzer, for example. The base device 21 further supplies voltage to the sniffer probe 10 via the electric lines 23, 24. Moreover, signal lines (not illustrated) connect the base device 21 with the sniffer probe 10.

The base device 21 comprises an ink supply portion 25 connected through an ink supply line 26 to an electromagnetic ink valve 27 situated in the hand-held device 11. The ink supply portion 25 supplies ink at an overpressure of approx. 1 bar to the ink valve 27. When the ink valve 27 is opened, an ink jet reaches the test object, not illustrated in FIG. 1, from the ink outlet 19.

In the hand-held device 11, the two light guides 16 and 17 are connected to a distance detector 30. Both the ink valve 27 and the distance detector 30 are controlled by a control device 31 in the hand-held device. The control unit 31 is electrically connected with a control unit of the base device 21.

The hand-held device is provided with a manual key switch 32 that is also electrically connected with the control unit 31. When the key switch 32 is operated, this means an input of an instruction to perform a measurement.

Finally, the hand-held device 11 includes an acceleration detector (BD) 33 responding to accelerations of the hand-held device and thus determining whether the hand-held device is held steadily.

Figure 2:
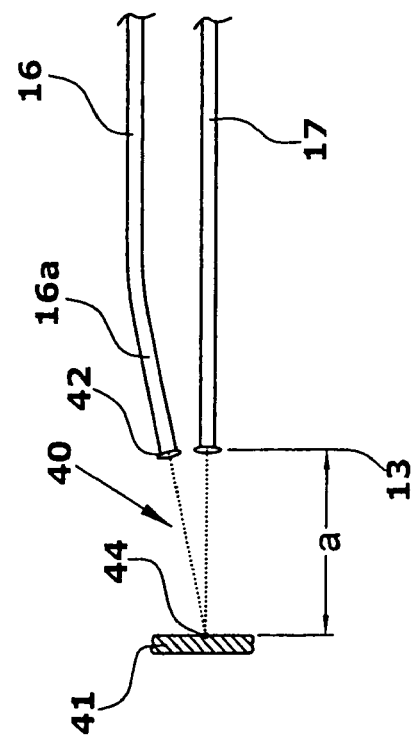
FIG. 2 is an upscaled view of the detail II in FIG. 1 for clarification of the function of the optical distance sensor.

FIG. 2 illustrates an embodiment of the optical distance detector 40 that detects the distance a of the end 13 of the sniffer tip 12 from the test object 41. The distance detector 30 inputs light into the light guide 16 at the rear end so that the front end 42 acts as a light transmitter transmitting a beam of light. The beam of light leaving at the end portion 16a forms a light spot 44 on the surface of the test object 41. If the sniffer probe exactly observes the desired distance a from the test object, the light guide 17 will receive a defined light intensity. The light guide 17 is connected to a light detector that responds when the intensity of the light received exceeds a threshold value. If the correct distance a is not observed, no or less light will impinge into the light guide 17. The light transmitter that supplies light into the light guide 16 and the light receiver that receives light from the light guide 17 are accommodated in the distance detector 30.

The leak detector described operates as follows:

When the sniffer tip 12 approaches a test object 41, the measurement is enabled as soon as a certain distance a or a distance range is reached. Either the measurement is now started automatically, or the user starts it by pressing the key switch 32. In response thereto, a pulse is sent to the ink valve 27 so that an ink point is squirted onto the test object 41. Alternatively, a series of ink points could be squirted in fast succession, thereby creating a plurality of ink points. The ink mark formed on the test object indicates the point at which the test was performed. Moreover, this mark indicates whether the sniffer probe has been held steadily.

In addition or as an alternative, the initiation of the test may be made dependent on further conditions. Thus, FIG. 1 illustrates an acceleration detector (BD) 33 that enables the measurement only if the acceleration is below a certain threshold value. This ensures that the measurement will only be made when the sniffer probe 10 is held steadily. Further conditions could be established for the acceptability of a measuring value, such as exceeding a trigger, falling short of a standard deviation when a plurality of measuring values are taken in rapid succession, and so on.

The invention offers a certain guarantee that the leak detection has been made under regular conditions. It makes an inappropriate handling of the leak detector more difficult.

The invention claimed is:

1. A leak detector comprising a sniffer probe, the sniffer probe including a hand-held device with a sniffer tip, wherein the sniffer probe is provided with a distance detector for detecting a defined distance of the sniffer tip from a test object which the distance detector enables the initiation of a test only if a predetermined distance range is detected.

2. The leak detector of claim 1, wherein the hand-held device is connected to a base device through a sniffer line, the base device including a vacuum pump and a test gas detector.

3. The leak detector of claim 1, including an acceleration detector to detect whether the hand-held device is held steadily, and
wherein a test is enabled only if the hand-held device is determined the accelerator detector to have been held steadily.

4. The leak detector of claim 3, including an ink outlet provided at the sniffer tip, said ink outlet being actuated upon or after a measurement and sprays a plurality of ink marks on the test object for the purpose of detecting whether the hand-held device has been held steadily.

5. The leak detector of claim 3, including a manual key switch ,the operation of said switch enabling a test only after the fulfillment of predetermined test conditions have been reported.

6. The leak detector of claim 1, wherein the distance detector is an optical detector comprising a light transmitter projecting a light spot and a light receiver receiving the reflected light.

7. The leak detector of claim 6, wherein at least one of the light transmitter and light receiver comprises a light guide connected to a distance detector arranged in the hand-held device.

* * * * *